May 11, 1948. R. L. WATKIN 2,441,302
FISH LURE
Filed March 28, 1945
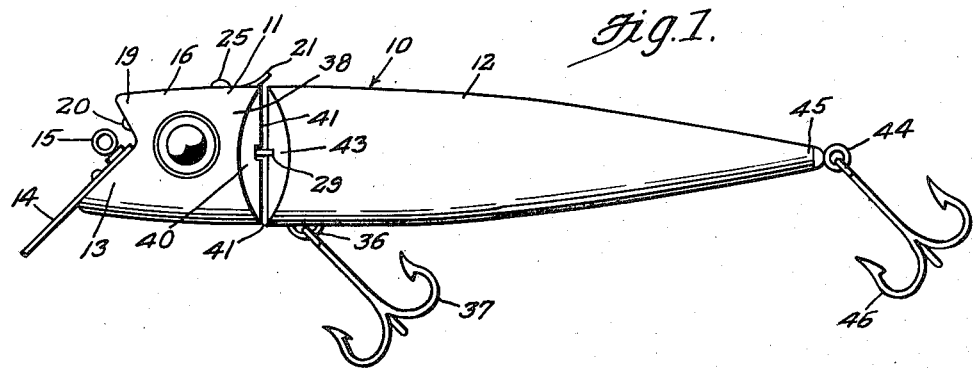
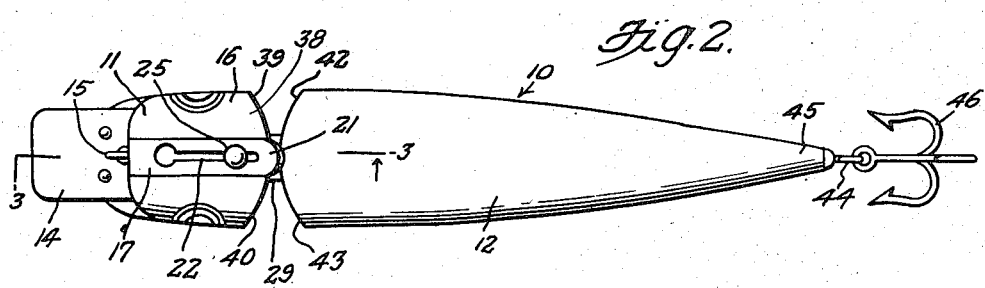
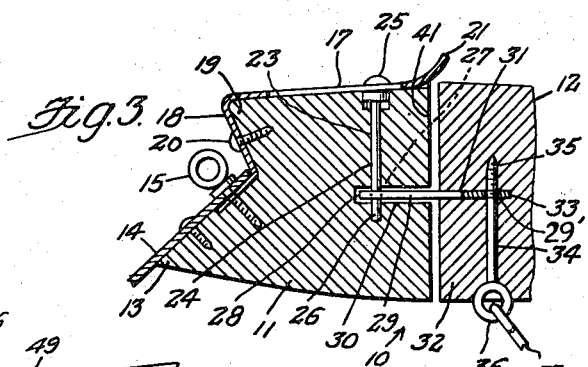
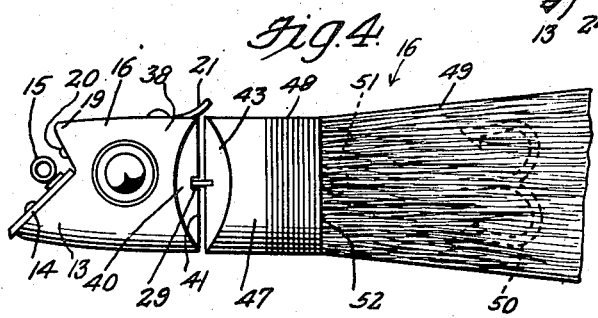
Inventor
Richard L. Watkin,
By Clarence A. O'Brien
and Harvey B. Jacobson
Attorneys Patented May 11, 1948

2,441,302

UNITED STATES PATENT OFFICE 2,441,302

FISH LURE

Richard L. Watkin, Knoxville, Tenn.

Application March 28, 1945, Serial No. 585,317

1 Claim. (Cl. 43—46)

This invention relates to improvements in a fish lure and has for an object to provide a lure comprising a head to which is secured a wriggling body.

Another object of the invention is to provide a fish lure arranged to simulate a small fish, fly or the like.

Another object of the invention is to provide a fishing plug adapted to simulate a variety of bait and to which different forms of bodies may be detachably connected.

Other features and advantages will become more readily apparent from the following description and the accompanying illustrative drawings in which:

Figure 1 is a side elevational view of a fishing plug,

Figure 2 is a top plan view thereof,

Figure 3 is a sectional view on line 3—3 of Figure 2, and

Figure 4 is a view similar to Figure 1, showing a different body.

Like reference characters indicate like parts in the drawings and in the following specification and in which 10 is a plug consisting of a head 11, to which a trailer body 12 is detachably connected in order that any one of a large variety of bodies or trailers may be substituted therefor. In this connection, it is well known that different varieties of fish will be attracted by certain characters of lures or plugs and will pay no attention to other kinds; furthermore, varying water conditions require varying bait, therefore it is necessary for the angler to carry in his tackle kit plugs, flies, wrigglers, etc., of various sizes, kinds and colors in order to be prepared for all conditions of angling. It is to save a large portion of the expense necessitated for so many lures and also the kit room that I have provided a plug head to which any number of trailers may be quickly and securely attached.

The head 11 is so formed to simulate that of a fish, fly or the like. From the underjaw 13 projects an inclined plate 14, for maintaining the plug upright in the water and also to cause wriggling and darting movement thereof in passing through the water. To the inner end of the plate is attached an eye 15, for connection with a fishing line (not shown). Countersunk in the top 16 of the head is a leaf spring 17, the turned-in end 18 of which is secured to the upper jaw 19, by a screw 20. The free end 21 of the spring is slightly turned up, to be easily lifted. A slot 22 is provided in the spring 17, which seats over a vertical bore 23 in said head, in which bore is an adjustable headed locking pin 24, the head 25 of which is held in said slot 22, whereby when the spring end 21 is raised the pin end 26 will be lifted out of a hole or aperture 27, in the end 28, of a pivot plate 29, seated in a slot 30, in the head 11, and projecting therefrom into an aligning slot 31, in the forward end 32, of the body 12. The end 33, of the pivot plate 29, is also provided with a hole or aperture 29' through which the pin 34, having a screw end 35, projects, whereby the plate 29 is secured to said portion 32. The pin 34 terminates outwardly of said body portion 32, in an eye 36, to which is connected a gang fish hook 37.

The end 38, of the head 11, is beveled or rounded on a transverse plane on both sides 39 and 40, to a vertical ridge 41, and the end 32, of the body 12, is similarly shaped as indicated at 42 and 43, whereby the body may have sidewise wriggling motion relative to the head 11. An eye 44 is provided at the tail end 45, to which the gang hook 46 is attached. It is to be noted that the slots 30 and 31 may be of different widths if desired in order to permit various lateral movements of the trailer 12.

In Figure 4 of the drawings, it will be seen that a different form of body portion 47 has been connected to the head 11, and to which portion is secured by wrappings 48, a series of streamers 49, within which is concealed a gang fish hook 50, connected to the eye 51, projecting from the end 52, of the member 47.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

A lure comprising a pivotally interconnected body and head having their adjacent ends rounded off on a transverse plane, said ends having oppositely disposed transverse slots formed therein, a pivot plate having apertures formed in its opposite ends disposed in said slots, a vertically adjustable headed locking pin extending downwardly through said head and through the aperture in the front end of said pivot plate, a slotted spring retaining arm disposed on said head engageable with the head of said locking pin for supporting the same in operative position, a screw eye insertable upwardly from the bottom of the body to extend through the aperture in the rear end of said pivot plate, gangs of hooks secured to said screw eye and to the rear end of said body, and means on the front end of said head for attaching a fish line.

RICHARD L. WATKIN.

REFERENCES CITED

The following references are of record in the file of this patent:

UNITED STATES PATENTS

| Number | Name | Date |
|---|---|---|
| 1,288,118 | Morian | Dec. 17, 1918 |
| 1,474,823 | Hines | Nov. 20, 1923 |
| 1,692,935 | Heddon | Nov. 27, 1928 |
| 1,814,450 | Nelson | July 14, 1931 |
| 1,832,172 | Winter | Nov. 17, 1931 |
| 2,017,903 | Johnson | Oct. 22, 1935 |
| 2,295,292 | Rogers | Sept. 8, 1942 |